Sept. 4, 1962 A. B. HAMMITT ET AL 3,052,330
CURTAIN WALL ASSEMBLY
Filed Dec. 17, 1957 8 Sheets-Sheet 1

INVENTORS
ANDREW B. HAMMITT
BY HERBERT L. BIRUM, JR.
Albert S Perry
ATTORNEY

Sept. 4, 1962 A. B. HAMMITT ET AL 3,052,330
CURTAIN WALL ASSEMBLY
Filed Dec. 17, 1957 8 Sheets-Sheet 2
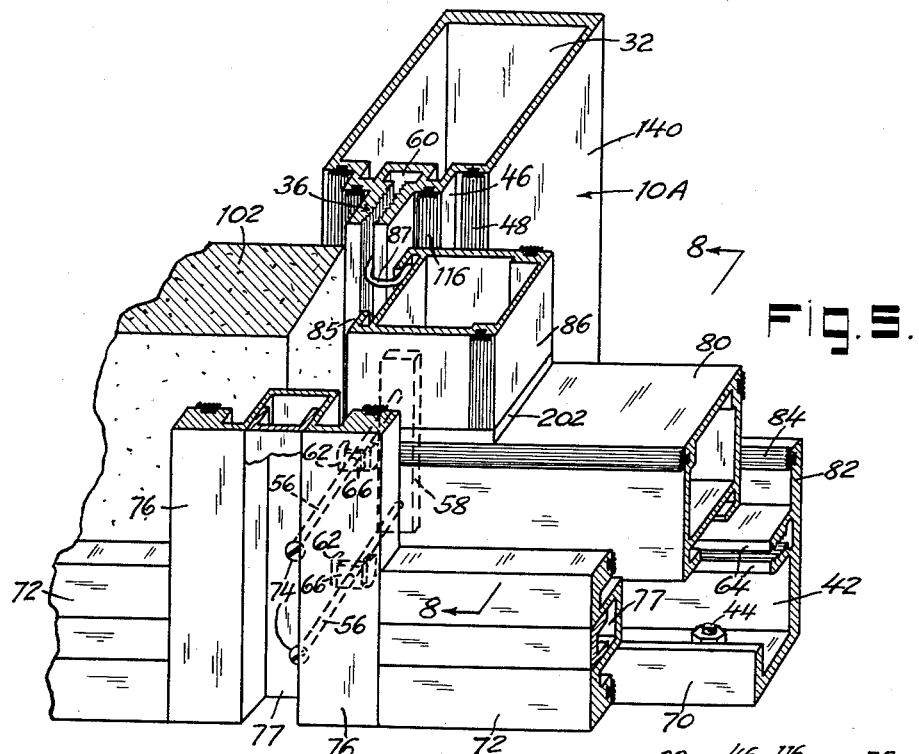
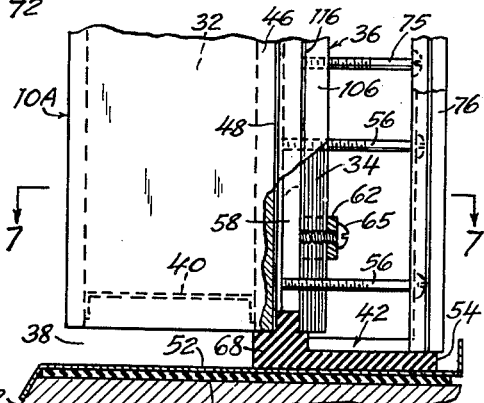
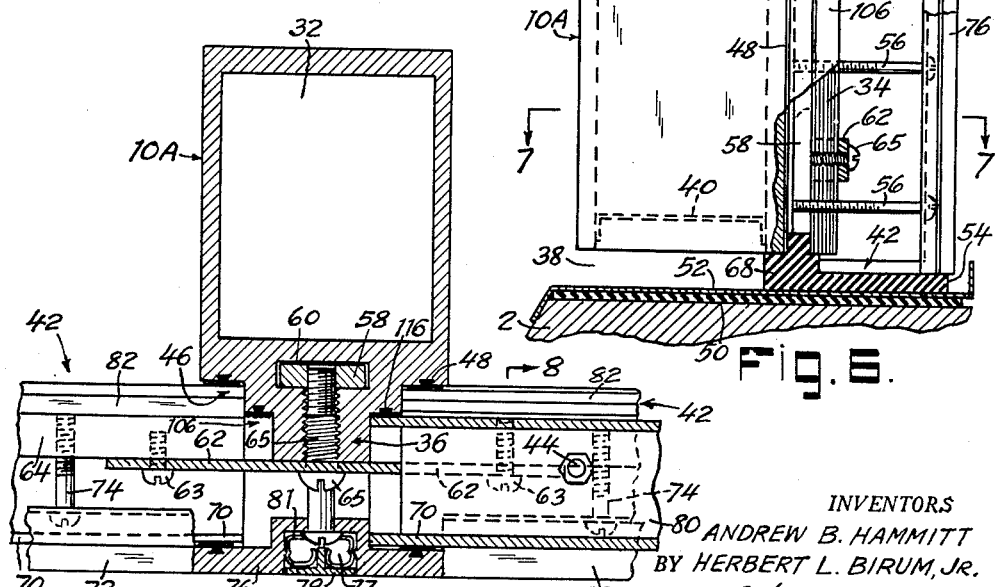
INVENTORS
ANDREW B. HAMMITT
BY HERBERT L. BIRUM, JR.
Albert Sperry
ATTORNEY

INVENTORS
ANDREW B. HAMMITT
BY HERBERT L. BIRUM, JR.

Albert Sperry.
ATTORNEY

Sept. 4, 1962  A. B. HAMMITT ET AL  3,052,330
CURTAIN WALL ASSEMBLY
Filed Dec. 17, 1957  8 Sheets-Sheet 4
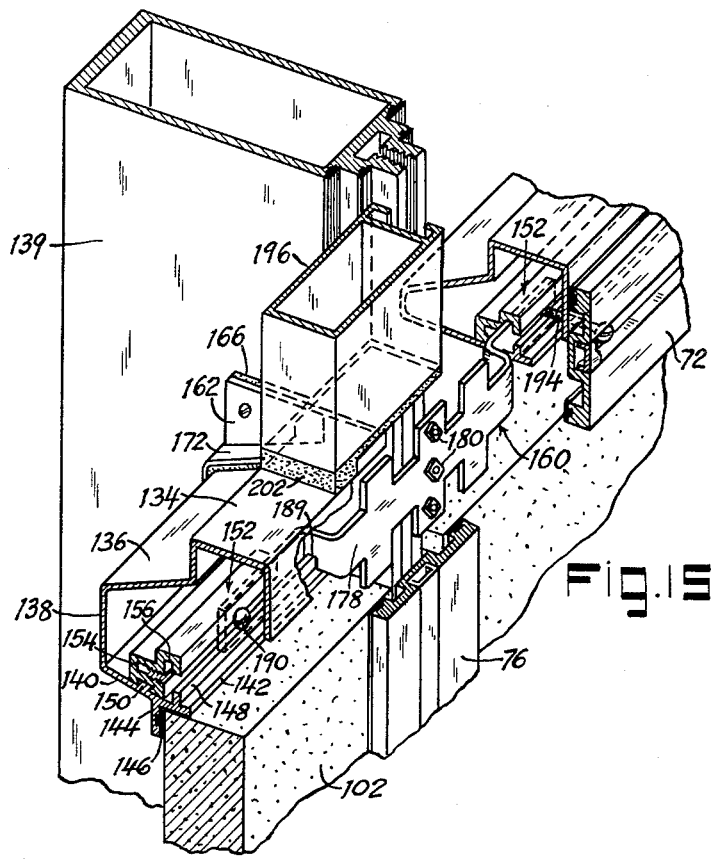
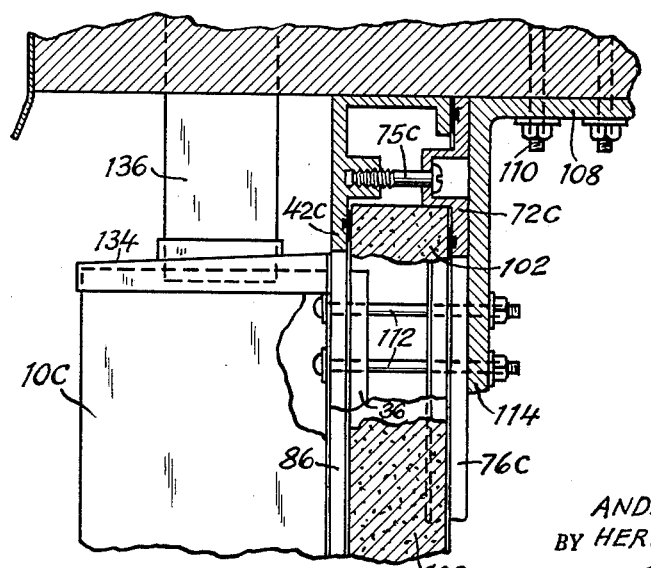
INVENTORS
ANDREW B. HAMMITT
BY HERBERT L. BIRUM, JR.
Albert Sperry
ATTORNEY Sept. 4, 1962 A. B. HAMMITT ET AL 3,052,330
CURTAIN WALL ASSEMBLY
Filed Dec. 17, 1957 8 Sheets-Sheet 5

INVENTORS
ANDREW B. HAMMITT
BY HERBERT L. BIRUM, Jr.
Albert Sperry.
ATTORNEY

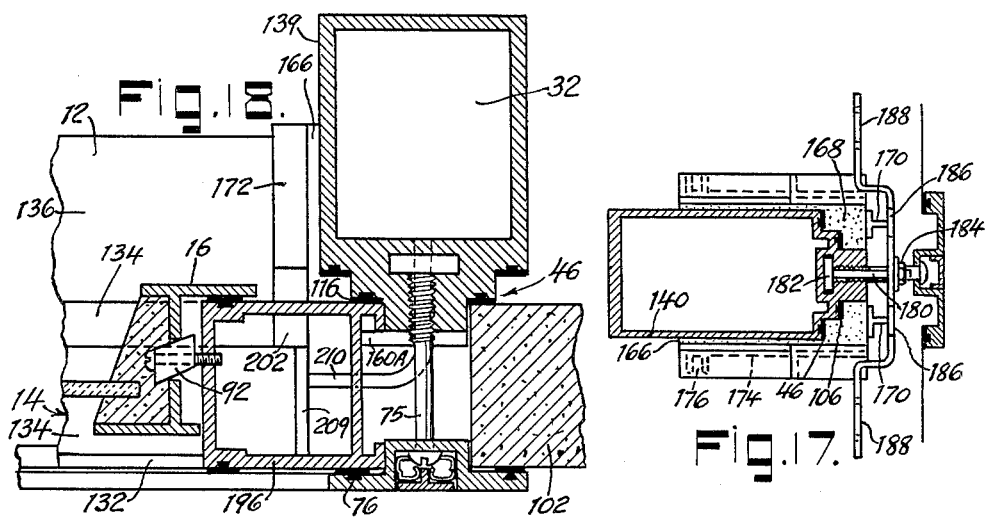
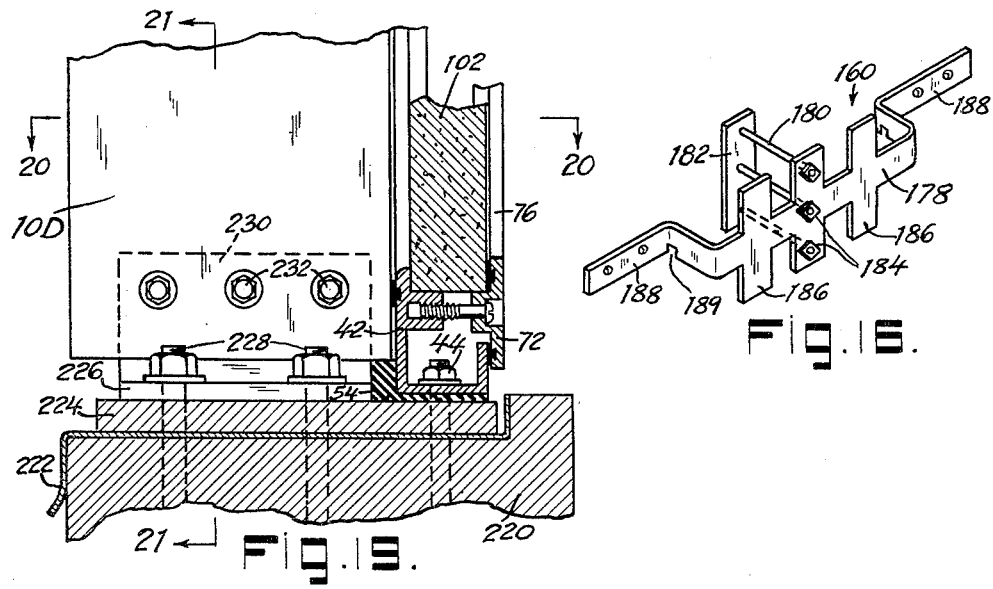
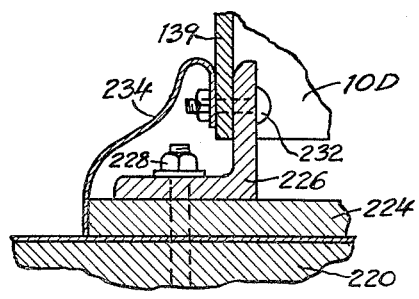
INVENTORS
ANDREW B. HAMMITT
BY HERBERT L. BIRUM, Jr.
Albert Sperry.
ATTORNEY INVENTORS
ANDREW B. HAMMITT
BY HERBERT L. BIRUM, Jr.
Albert Sperry
ATTORNEY INVENTORS
ANDREW B. HAMMITT
BY HERBERT L. BIRUM, Jr.
Albert Sperry.
ATTORNEY

United States Patent Office 3,052,330
Patented Sept. 4, 1962

3,052,330
CURTAIN WALL ASSEMBLY
Andrew B. Hammitt, 909 W. State St., Trenton, N.J., and Herbert L. Birum, Jr., Pleasant Valley Road, Titusville, N.J.
Filed Dec. 17, 1957, Ser. No. 703,325
2 Claims. (Cl. 189—34)

This invention relates to curtain wall assemblies which are employed as the facing or decorative exterior assembly of a building. The invention is particularly directed to constructions of this type which embody a limited number of elements capable of being readily and economically erected to provide an attractive construction which is weather-tight and wind and vacuum resistant and which also may serve as a load bearing assembly.

Most curtain wall assemblies have heretofore been individually designed for each separate installation and have accordingly been expensive and difficult to erect. Moreover, expansion and contraction of the elements of prior curtain walls have frequently given rise to leakage of rain and wind, whereas condensation of moisture within the assembly has presented problems which are difficult of solution and often result in water damage to the interior of the building.

Prior constructions also have included extended metallic connections between the exterior and interior of the building which render it difficult to insulate the building against heat loss and tend to increase the transmission of sound through the curtain wall. Vibrations set up in large panels included in prior curtain wall assemblies have also been objectionable.

In accordance with the present invention these objections and limitations in curtain wall constructions of the prior art are overcome and means are provided which permit the use of extruded, rolled or other preformed elements in the erection of curtain walls varying greatly in their architectural design and dimensional characteristics. Furthermore, gaskets or sealing elements are provided which are arranged to prevent leakage and decrease the transmission of sound through the assembly, and further are designed to allow for unusual expansion and contraction of the metal members of the assembly with changes in temperature while maintaining a watertight seal therebetween. The construction therefore renders it possible to form the elements of extruded aluminum or other material having a relatively high coefficient of expansion. At the same time the weight of the elements may be reduced while employing new structural designs possessing sufficient strength to withstand high wind and vacuum forces. If desired the elements may be constructed and arranged so that the curtain wall will serve as a load bearing assembly.

The present invention further is designed to permit erection of a curtain wall from the interior of a building by workmen standing on the ground and on the floors of the building. In this way the need for scaffolding is eliminated and the cost of erection is greatly reduced.

Accordingly, the principal objects of the present invention are to decrease the cost of producing and erecting curtain wall assemblies, to maintain a weather-tight seal between the elements of the assembly, and to permit the use of preformed members in the erection of curtain walls.

Other objects of the invention are to provide a limited number of preformed elements which may be variously assembled and erected from floor levels without the use of exterior scaffolding and to permit the use thereof in curtain walls varying greatly in architectural design and dimensional relations.

A particular object of the invention is to provide a water-tight assembly which allows for such expansion and contraction of the elements as to permit the use of aluminum or other materials having a relatively high coefficient of expansion.

These and other objects and features of the present invention will appear from the following description thereof wherein reference is made to the figures of the accompanying drawings.

In the drawings:

FIG. 5 is a perspective illustrating that portion of the assembly of FIGS. 1 and 2 located adjacent the foundation of the building as seen from the interior;

FIG. 6 is a view partly in elevation and partly in section showing the lower end of the mullion adjacent the foundation;

FIG. 7 is a horizontal sectional view of the construction shown in FIG. 5 taken on the line 7—7 of FIG. 6;

FIG. 12 is a vertical sectional view illustrating the upper extremity of the curtain wall assembly shown in FIG. 2;

FIG. 15 is a perspective illustrating typical elements which may be used in supporting the sills or headers of a curtain wall assembly;

FIG. 16 is a perspective illustrating a structural tie strap employed in the construction of FIG. 15;

FIG. 17 is a horizontal sectional view through the assembly shown in FIG. 15;

FIG. 18 is a horizontal sectional view taken through the mullion of a curtain wall assembly embodying the present invention but illustrating an alternative arrangement of the elements forming the curtain wall;

FIG. 19 is a vertical sectional view through the lower portion of a curtain wall embodying the present invention and employed as a load bearing structure;

FIG. 21 is a vertical sectional view through a portion of the assembly shown in FIG. 19 taken on the line 21—21 thereof;

Figure 1:
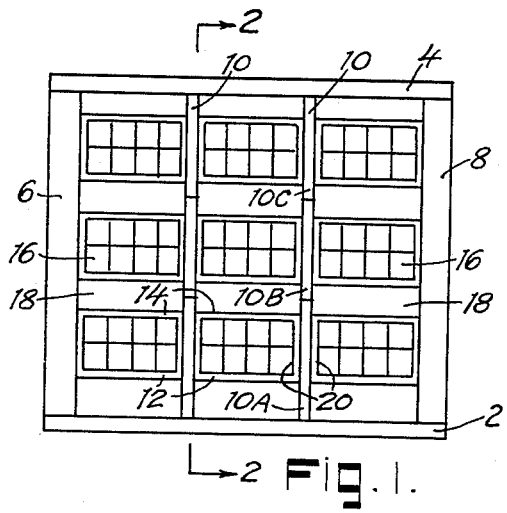
FIG. 1 is a front elevation of a typical building having a curtain wall embodying the present invention.
Figure 2:
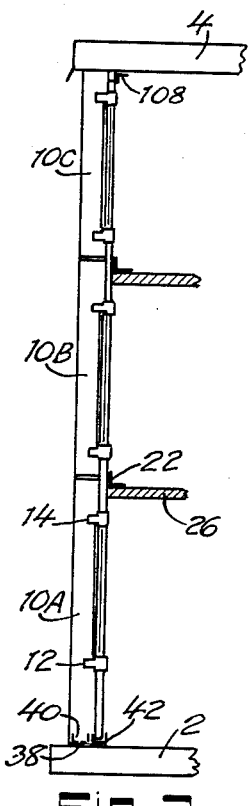
FIG. 2 is a vertical sectional view of the building shown in FIG. 1 taken on the line 2—2 thereof.

In that form of the invention chosen for purposes of illustration in FIGS. 1 and 2 of the drawings, the curtain wall extends from the foundation 2 to the roof 4 and from a brick, masonry or other form of corner construction 6 at one side of the building to a corresponding corner construction 8 at the opposite side of the building.

The curtain wall itself embodies vertically extending mullions 10 which may be suitably spaced horizontally to conform with any desired architectural or structural design. However, because of the novel design of the various elements of the assembly, the mullions may be spaced apart a distance of 10 feet or more in contrast with the usual spacing of mullions at only 5 to 6 feet.

Sills 12 and heads 14 extend horizontally between the mullions 10 at suitable locations to receive and support window frame assemblies 16, glass or other light transmitting elements, whereas the spandrels 18 which extend between the head on one floor and the sill on a floor above may be formed of any suitable or preferred type of sheet material, preformed insulated panel, metal facing or the like as desired for any particular installation. The vertical edges of the panel or sheet material employed in the spandrel are in sealed engagement with the mullions 10 and along the foundation 2 and the roof 4 of the curtain wall assembly affording a water-tight and weather-tight construction.

The mullions 10, sills 12 and heads 14, as well as various other elements of the assembly, are preferably formed as strips or lengths of extruded aluminum of uniform cross section throughout the length thereof. Such elements are light in weight and in accordance with the present invention, they are so designed as to afford the requisite strength to insure unusual wind and vacuum resistance while permitting the mullions to be spaced substantially twice as far apart as has been possible heretofore. Moreover, extruded aluminum members are capable of being cut or modified on the job while using hand tools or light power driven tools to cut the elements to required lengths or to accommodate the elements to any unusual conditions or misalignment of the structural framework members of the building which may be encountered.

Figure 3:
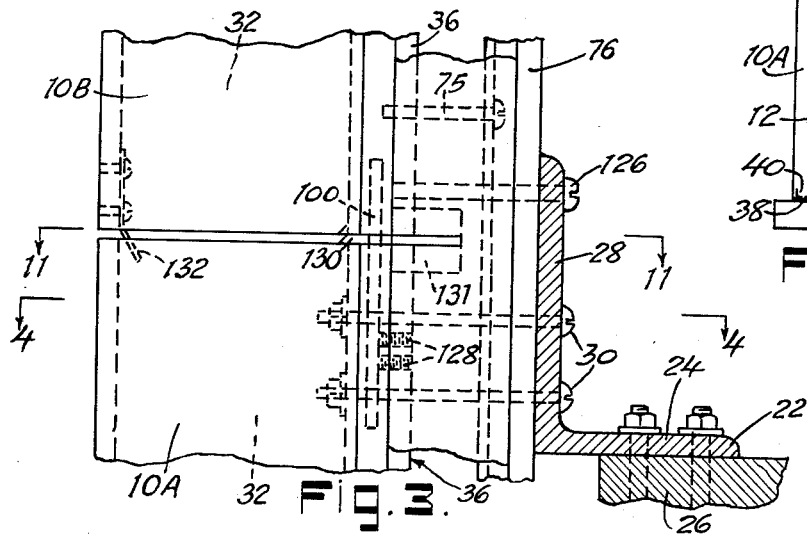
FIG. 3 is a vertical sectional view of that portion of the assembly shown in FIG. 2 located near a floor.
Figure 4:
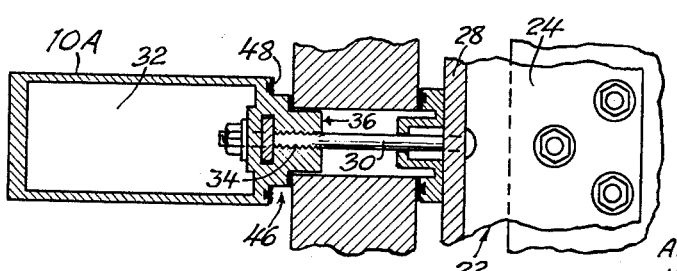
FIG. 4 is a horizontal sectional view of the portion of the assembly illustrated in FIG. 3 taken on the line 4—4 thereof.

As shown in FIGS. 2 and 3, each mullion may be composed of a series of mullion sections 10A, 10B, etc. which are approximately equal in length to the distance between the floors. The mullion sections are rigidly supported and suspended from the floor above and extend downward to a point adjacent the foundation or the next floor below so that the sections are in alignment and present the appearance of being a single continuous vertical mullion. Thus the mullion section 10A is rigidly supported adjacent its upper end from an angle member 22 having a base 24 which is bolted to the floor 26 and provided with an upstanding flange 28 spaced outwardly from the edge of the floor. Bolts 30 extend through flange 28 and into the open upper end of the hollow body 32 of the mullion section. The threaded ends of the bolts 30 preferably project through openings drilled in the rear face of the mullion in alignment with an inwardly facing thread coupling channel 34 formed in a rearwardly projecting tongue 36 which extends vertically throughout the length of the mullion. A sealing washer and a nut are applied to each bolt to provide a positive and rigid water-tight attachment of the upper end of the mullion to the angle member 22.

Figure 8:
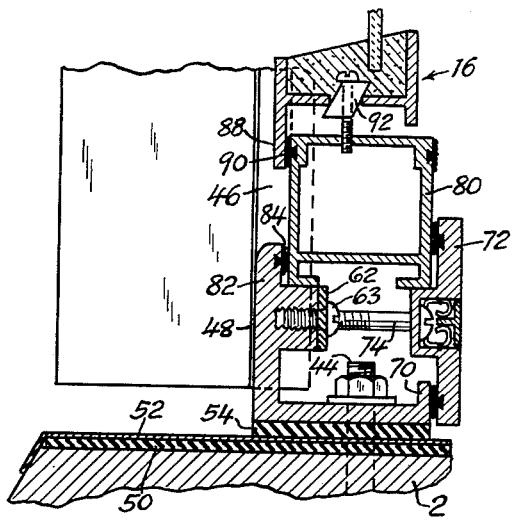
FIG. 8 is a vertical sectional view of the construction shown in FIG. 5 taken on the line 8—8 thereof.

As shown in FIGS. 5 and 6 the lower end of the mullion section 10A is positioned adjacent the foundation 2 but is preferably spaced vertically therefrom to provide a drainage outlet 38. A screen 40 may be positioned within the hollow central body 32 of the mullion near the lower end thereof to exclude vermin and dirt. Foundation members 42 are fixedly mounted on the foundation 2 by the anchor bolts 44 as shown in FIG. 8. A gasket 50 is placed on the upper surface of the foundation 2 and a flashing strip 52 is placed over the gasket 50. A second gasket 54 is located between the flashing strip 52 and the members 42, and the gaskets are compressed by tightening of the anchor bolts 44 as the members 42 are secured in place. In this way the space between foundation members 42 and the foundation 2 is effectively sealed despite any irregularities in the upper surfaces of the foundation.

The ends of the foundation members 42 are positioned in the reveals 46 on opposite sides of the tongue 36 of the mullion as shown in FIGS. 5 and 7. The outer faces of the members 42 are held in sealing engagement with sealing strips 48 located on the inner faces of the reveals 46. The inner edges of the foundation members 42 are provided with upwardly projecting flanges 70 and the lower end of a vertically extending cover strip 76 extends downward to a point adjacent the foundation and into a position wherein its opposite edges overlap and bear against the flanges 70 of the foundation members as shown in FIG. 7. The lower end of the mullion section 10A is secured to the vertical cover strip 76 and to foundation members 42 by bolts 56 which extend through the cover strip 76 and thread coupling channel 34. The inner ends of bolts 56 are threaded into a plate 58 positioned within a transversely extending slot 60 extending throughout the length of the mullion section at the base of the thread coupling channel 34 in the tongue 36 of the mullion. Tightening of the bolts 56 therefore serves to draw the lower end of mullion section 10A and the vertical cover strip 76 together in clamping engagement with the foundation members 42 and further serves to compress the sealing strip 48 on the mullion to improve the sealing of the joint between the mullion and foundation members 42.

If preferred, the plate 58 may have the bolts 56 welded or otherwise rigidly secured thereto, and the plate and bolts may be inserted into the slot 60 as a unit. In that event, the threaded ends of the bolts which extend through the vertical cover strip 76 have nuts applied thereto and housed in the central channel 77 of the cover strip beneath the cap strip 79. The latter strip is preferably held in place by spring clips 81 positioned within the channel 77 of the cover strip.

In order further to strengthen the attachment of the lower end of the mullion section 10A to the foundation members 42, a tie strap 62 may extend across the space between the ends of the foundation members adjacent the inner face of the tongue 36 of the mullion. Bolts 63 are passed through the tie strap and into a thread coupling channel 64 formed on the inner face of the outer flange 82 of each foundation member 42. In a similar way a bolt 65 is passed through the central portion of the tie strap 62 and into the thread coupling channel 34 in the tongue 36 of the mullion. The thread coupling channels 34 and 64 are preferably of the character shown and described in Reissue Patent No. 24,133 and permit the insertion of a bolt at any point throughout the length thereof.

With this construction, the lower end of the mullion is secured in place adjacent the foundation. However, the connection afforded is such that it will permit limited vertical movement of the lower end of the mullion sufficient to allow for expansion and contraction of the mullion section with changes in temperature. The gasket 54 has a raised portion 68 which engages the lower end of the mullion in position to close and seal the transverse slot 60 and is sufficiently compressible to maintain such sealing contact during expansion or contraction of the mullion.

The members 42 are each provided on their inner face with a horizontal cover strip 72 which extends lengthwise thereof with their ends abutting the vertical cover strip 76. The lower edge of each cover strip overlaps the inner face of flange 70, and the strips are held in place by bolts 74 passed through the strips and into the thread coupling channels 64 at suitable points throughout the length thereof. In a similar way the vertical cover strip is secured to the mullion throughout its length by bolts 75 having the heads thereof received in channel 77 of the cover strip while their threaded ends extend into the thread coupling channel 34 of the mullion.

The cover strips 72 and 76 not only serve to present a finished and trim appearance to the interior of the assembly but further serve to secure other elements of the curtain wall in place. Thus as shown in FIG. 8, the upper edge of the horizontal cover strip 72 overlaps the lower edge of a jamb member 80. The end of jamb members 80 extends beyond the end of the member 42 and into reveal 106 on the mullion section 10A in position to engage the sealing strip 116 on the inner face of the reveal. The outer side of the jamb member 80 is overlapped by the upwardly projecting outer flange 82 of the member 42. A sealing strip 84 on the inner face of flange 82 serves to seal the space between the flange and the jamb member 80 and is compressed by the bolts 74 which serve to urge the cover strip toward the jamb member 80 and the member 42. The cover strip thus serves to secure the jamb member in place to form the lower side of a window opening. In the same way the vertical cover strip 76 serves as shown on the right hand side of FIG. 5 to urge a vertically extending jamb member 86 into sealing engagement with the sealing strip 116 on the inner face of the reveal 106 on the mullion and to secure it in place.

As shown in FIGS. 5 and 8, the jamb members 80 and 86 may be formed of extruded aluminum members and are preferably provided on their inner face with flanges 85 to which retaining hooks 87 may be applied for engagement with the thread coupling channel 34 or other adjacent members to hold the jamb member in place temporarily during assembly, as shown in FIG. 5. Ordinarily such retaining hooks can be left in place although they can be removed prior to application of the cover strip 76 is desired.

The jamb members 80 and 86 cooperate to complete a window opening adapted to receive the window frame assembly 16. The latter assembly may be of any conventional or desired type, and as shown in FIG. 8 is provided with a marginal flange 88 engageable with a sealing strip 90 extending lengthwise of the jamb member on the outer face thereof. The window frame may be forced inwardly so as to compress the sealing strip 90 and secure the assembly to the jamb members by means of adjusting members 92 of the type shown and described in application Serial No. 615,149, now Patent No. 3,008,368, dated November 14, 1961.

Figure 9:
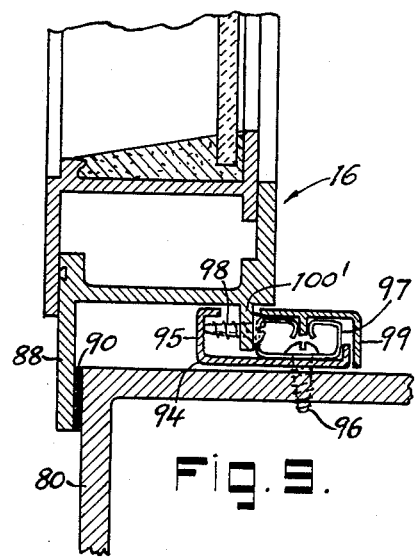
FIG. 9 is a vertical sectional view similar to FIG. 8 but illustrating an alternative arrangement embodying a window strip and compressor.

In the alternative and as shown in FIG. 9, the jamb members 80 and 86 may have strips 94 secured thereto by screws 96 or the like and self-tapping screws or bolts 98 are then passed through the flange 100' of the window assembly 16 to engage the flange 95 of the strip 94 to force the window assembly inward. In this way, flange 88 of the window frame will serve to compress the sealing strip 90 insuring a water-tight seal about the edges of the window frame assembly. Spring clips 97 are secured to the upper surface of the strip 94 by the screws 96 and a snap-on trim strip 99 is applied to the clips providing a neat, attractive finish about the window assembly on the interior thereof.

Instead of using a window assembly of the type shown in FIG. 8, any other light transmitting structure desired may be mounted within the opening defined by the jamb members. Thus, glass block, thermal insulating multiple glass panes or other assemblies may be employed as required for any architectural design required.

When the lower edge of the window assembly 16, or other forms of light transmitting means, is spaced from the foundation, or when it is omitted altogether from any section or bay of the curtain wall assembly, the jamb member 80 illustrated on the right hand side of FIG. 5 is omitted and the elements assembled as shown on the left hand side thereof. The lower edge of the panel or sheet of material 102 is then positioned between the upstanding flange 82 of the member 42 and the upper edge of the horizontal cover strip 72. The vertical edge of the panel 102 is positioned adjacent the mullion 10A in the inner reveal 106 so as to engage the sealing strip 116 on the inner face of reveal 106. The edge of vertical cover strip 76 overlaps the vertical edge of the panel 102 as shown in FIG. 5, and the panel is held in place and pressed into engagement with the sealing strips 84 and 116 on the member 42 and the mullion, respectively, by tightening the bolts which secure the horizontal and vertical cover strips 72 and 76 in place. The panel 102 is thus securely mounted and sealed about its edges in a manner which prevents leakage under any and all weather conditions.

Figure 10:
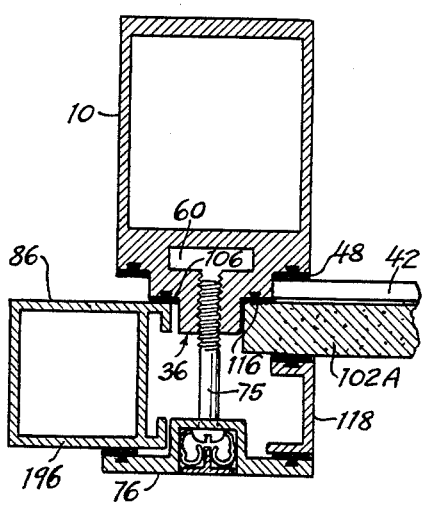
FIG. 10 is a sectional view illustrating a modified detail of the assembly.
Figure 11:
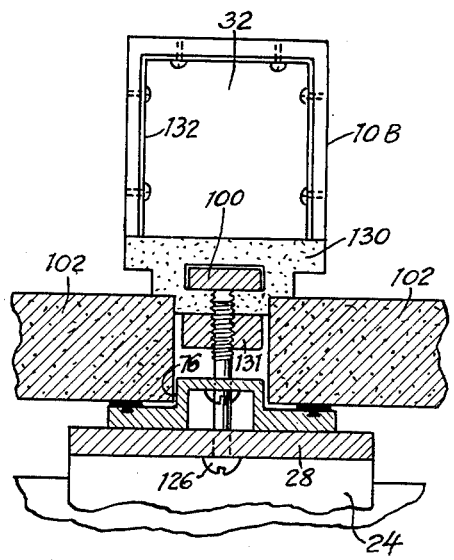
FIG. 11 is a horizontal sectional view illustrating a detail of the assembly of FIG. 3 taken on the line 11—11 thereof.

As shown in FIG. 10, if the panel 102A is thinner than the distance between the sealing strip 116 on the reveal 106 of the mullion and the cover strip 76, a filler strip 118 is inserted between the cover strip 76 and the panel to urge the panel into sealing engagement with the sealing strip 116. A similar filler strip may be used to urge the horizontal edge of a thin panel into sealing engagement with the sealing strip 84 on the flange 82 of foundation member 42 or at other locations throughout the assembly where required.

As shown in FIG. 3, the upper end of the mullion section 10A is located a short distance, say an inch or two, below the upper edge of the upstanding flange 28 of the mullion supporting angle member 22. The mullion section 10B is supported vertically at its upper end from the floor above in the same manner as section 10A, whereas the lower end of mullion section 10B is spaced a short distance from the upper end of section 10A. The lower end of mullion section 10B is held in place by means of one or more bolts 126 which extend through the upstanding flange 28 and into the thread coupling channel 34 in the rearwardly extending tongue 36 of section 10B. A vertically extending splice bar 100 is positioned within the transversely extending slot 60 at the base of the thread coupling channel 34 in mullion section 10A and extends upwardly beyond the end of section 10A into the corresponding slot 60 in mullion section 10B. In applying the splice bar 100 to mullion section 10A, it is fixed in position in the slot 60 of the section 10A by set screws 128 engaging the ribbed sides of the channel 34 before the holes for bolts 30 are drilled in the mullion. Thereafter, the bolts 30 serve to hold the splice bar fixedly in place. The upper end of the splice bar projects above section 10A and has a sliding engagement with the lower end of section 10B whereby section 10B can be lowered into place during erection. The bolt or bolts 126 are then applied but the assembly is such as to permit limited expansion and contraction of the mullion section 10B upon change in temperature.

The lower end of section 10B is spaced a short distance, say one quarter inch, from the upper end of section 10A and a suitable gasket 130 is positioned between the sections and extends about the splice bar 100 and across the inner side of the central opening 32 in the mullions to seal the space therebetween. The inner edge of the gasket 130 is preferably enlarged as shown at 131 to extend above and below the space between the mullion sections adjacent the tongues 36 thereof. In addition, a flashing strip 132 is secured to the lower inner end of section 10B about the front and sides of the hollow body 32 and fits within the upper end of section 10A to conceal the space and prevent excessive leakage or the passage of air or wind into or across the sections in a manner which might cause whistling or other undesirable noises.

As shown in FIGS. 2 and 12, the upper end of the uppermost mullion section 10C is suspended from a hanger 108 which is generally similar to the angle member 22 of FIG. 3 but is inverted and secured to the under surface of the roof 4 by bolts 110. The bolts 112 which serve to secure the mullion section 10C in place pass through the vertical flange 114 of the hanger 108 and are arranged with their heads and washers located within the hollow body 32 of its mullion, so that nuts applied to the bolts are exposed at the interior of the assembly to be tightened in suspending the mullion section from the hanger. A closure cap 134 is applied to the top of the mullion section, whereas the upper edge of the curtain wall assembly is secured in place adjacent the roof 4 by a foundation member 42C, vertical cover strip 76C, as well as horizontal cover strip 72C and other elements constructed and arranged substantially as shown in FIGS. 5 and 8 with reference to the foundation of the building. The elements adjacent the roof will, of course, be inverted from the positions they assume adjacent the foundation. Further, if desired, the roof of the building may be provided with a drain 136 leading into the upper end of the hollow body 32 of the mullion section 10C through the cap 134 so that the mullions may also serve as a downspout to drain water from the roof to the drainage outlet 38 adjacent the foundation.

In those locations where a spandrel is used, the window openings in the curtain wall are provided with horizontally extending sills 12 and heads 14. The panels 102 which form the spandrels 18 may extend from the foundation to a sill or from the head of a window opening on one floor to the sill of a window opening on a floor above or to the roof. The sills and heads are preferably identical in construction and may be formed of extruded aluminum or other metal members. The head 14 is inverted in its position as compared with the sill 12 and both the head and sill extend horizontally from one mullion to the next with their ends positioned adjacent the side faces 139 of the mullions.

Figure 14A:
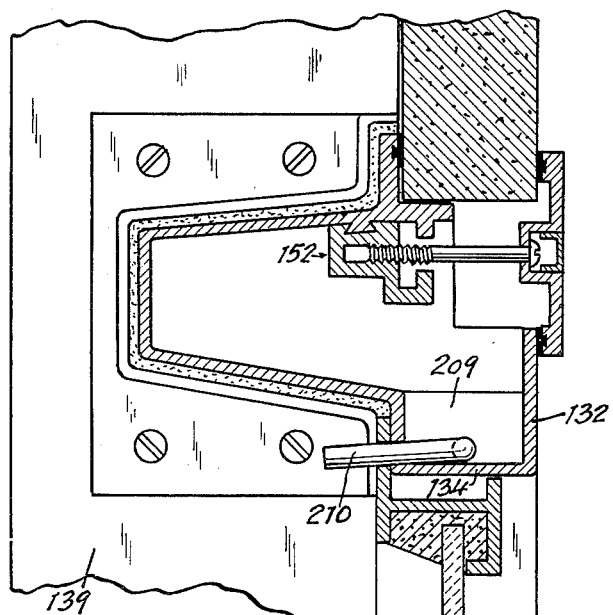
FIG. 14A is a vertical sectional view through a head similar to the sill of FIG. 14.
Figure 14:
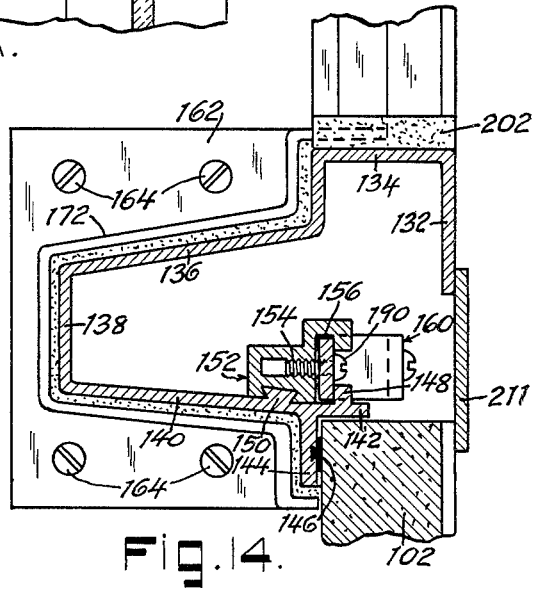
FIG. 14 is a vertical sectional view through a preferred type of sill adapted for use in the curtain wall of the present invention.
Figure 20:
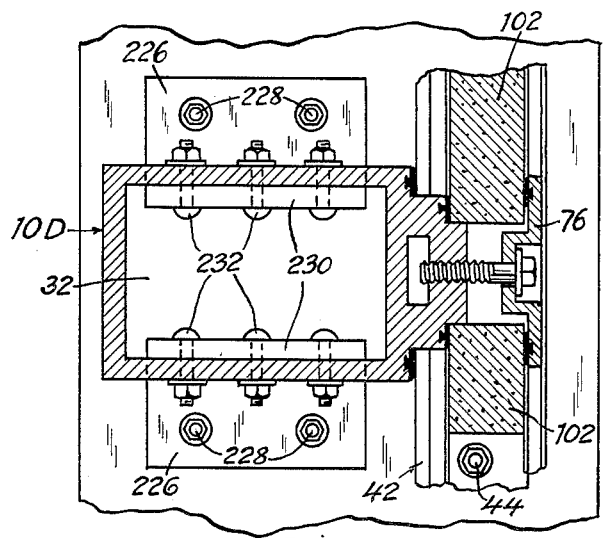
FIG. 20 is a horizontal sectional view showing the construction illustrated in FIG. 19 taken on the line 20—20 thereof.

As shown in FIGS. 14 and 15, the sill 12 is formed with an inner face 132, a top face 134, an inclined drain surface 136 and an outer face 138. The lower portion 140 of the sill is inclined inwardly from the outer face 138 and is formed at its inner extremity with a positioning flange 142 and a sealing flange 144. The sealing flange 144 is provided with a sealing strip 146 which engages the outer face of the panel 102 of the spandrel 18.

The lower portion 140 of the sill is formed on its upper inner surface with a longitudinally extending rib 148 and a parallel keyway 150. A slide member 152 is formed for slidable engagement with the keyway 150 and is provided with a thread coupling channel 154 and an upper downwardly facing groove 156. The groove 156 on the slide cooperates with the rib 148 and the inner face of the lower portion of the slide to provide a slot or housing 158 designed to receive one end of a structural tie strap 160 which serves to secure the sill members in place on opposite sides of the mullion.

Figure 13:
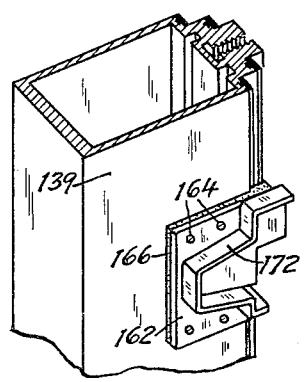
FIG. 13 is a perspective illustrating a portion of the assembly which may be employed in supporting a sill.

The end of each sill is housed within a supporting plate 162 shown in FIG. 13 and designed to be secured to the side face 139 of the mullion by suitable means such as self tapping screws 164 which pass through the supporting plate and into holes bored in the mullion. A gasket 166 is positioned between the base of the supporting plate and the side face 139 of the mullion and is compressed by the screws 164. The inner edge of the gasket 166 is enlarged at 168 as shown in FIG. 17 so that it will extend into and fill the space formed by the reveals 46 and 106. Pressure members 170 bear against the inner surface of the enlarged portions 168 of gaskets 166 and are compressed into sealing contact with the reveals 46 and 106 by the structural tie strap 160.

The supporting plate 162 preferably is formed with a flange 172 extending about the top, front and lower edges thereof and an end sealing gasket 174 is embraced by the flange 172 and has a groove 176 therein for receiving the end of the sill 12. As shown in FIG. 17, the groove 176 presents inclined sides leading to parallel inner side faces which are spaced apart a distance less than the thickness of the material of which the sill is formed, whereas the depth is substantially greater than any longitudinal movement of the end of the sill which may be caused by expansion and contraction of the sill. In this way the gasket 174 affords a tight sealing contact with the end and sides of the sill throughout the surface thereof despite substantial movement of the end with respect to the gasket as the sill expands and contracts upon change in temperature.

The structural tie strap 160 serves to secure the sills on opposite sides of the mullion in place so as to form a positive structural connection between the sill and the mullion. It thereby serves to transmit to the mullion all wind, load or other forces applied to the sill and head. For this purpose the tie strap is provided with a central portion 178 which extends across the inner face of the tongue 36 of the mullion and is extended vertically to receive the attaching bolts 180. These bolts, as shown in FIG. 16, are carried by a bolt plate 182 which is positioned within the cross slot 60 at the base of the thread coupling channel 34. The bolt plate 182 is slipped up or down along the cross slot 60 of the mullion to the desired position to support the sills and the tie strap 160 is then applied to the projecting end of the bolts and secured in place by tightening the nuts 184. The tie strap 160 preferably also includes vertically extending portions 186 which bear against the pressure members 170 to urge the enlarged portion 168 of the gasket 164 against the base and side surfaces of reveals 46 and 106 to provide a water-tight seal at this point.

The end portion 188 of the tie strap 160 are offset from the central portion 178 and extend outward at opposite sides of the mullion into position to be received in the slot 158 defined by the cooperating surfaces of the rib 148 on the sill and the downwardly facing groove 156 and the lower inner face of the slide member 152. The outwardly turned portions of the tie strap adjacent the end portions 188 thereof are notched out as shown at 189 in FIG. 16 so that the lower edges of the end portions may be housed within the slot 158 behind the rib 148 on the sill. The end portions 188 of the tie plate are formed with bolt holes therein through which bolts 190 pass into retaining engagement with the thread coupling channel 154 of the slide member. The bolts 190 thus serve to secure the tie strap 160 and slides 152 together in fixed positions at opposite sides of the mullion, whereas the sills 12 are supported by the supporting plates 162 and by the slides 152.

The slide members 152 need only be a foot or so in length and in positioning the sill, the slide member is slipped back along the keyway 150 away from the end of the sill. The end portion 188 of the tie strap can then be moved forward readily into position within the sill with the upper edge thereof received in the groove 156 and the lower edge received behind the rib 148 of the sill. Thereafter the slide 152 is moved back along the keyway 150 toward the end of the sill and behind the end portion 188 of the tie strap so that the tie strap is held against transverse tilting movement. Upon application of the bolts 190, the tie strap and slide are positively secured together providing a strong rigid assembly which serves to support the sill (or head) directly by the mullion. However, since the sill and slide are relatively movable longitudinally by reason of the keyway connection therebetween, the sill is free to expand and contract lengthwise upon change in temperature without imposing any strain or distorting force on the mullions by which it is supported.

The construction thus provided establishes a positive support for the sill by which all forces applied thereto are transmitted to the mullion while the sill itself has a floating connection with the mullion in an endwise direction. At the same time the form of the gasket 174 is such as to assure complete sealing contact of the space between the end of the sill and the mullion under all temperature conditions. This freedom in endwise movement of the sill serves to permit the use of sill members and heads which are of exceptional length and possess high coefficients of expansion without encountering leakage or imposing undue strain on the mullions.

The panel of material 102 which forms the spandrel 18 of the curtain wall assembly is secured at its upper edge to the sill 12 by means of a horizontally extending cover strip 72 bearing against the inner face of the panel and serving to urge the outer face of the panel into sealing engagement with the sealing strip 146 carried by the sealing flange 144 on the lower edge of the sill. The cover strip is forced against the inner face of the panel by bolts 194 which pass through the cover strip and into the thread coupling channel 154 in the slide 152. Slides 152, or various lengths thereof, are therefore positioned at suitable points throughout the length of the sill to insure the desired attachment of the cover plate and sheet material to the sill.

In order to complete a window opening designed to receive a window assembly 16, jamb member sections 196 extend vertically from the sill 12 to the head 14 of the window opening and are positioned on opposite sides of the tongue 36 of the mullion with the corner of the section 196 positioned in the reveal 106 so as to bear against the sealing strips 116 as shown in FIG. 18. The jamb members are held in place by the vertical cover strip 76 which extends lengthwise of the mullion on the inner face of the assembly and is secured in place by the bolts 75 passing through the cover strip and into the thread coupling channel 34 in the tongue 36.

A supplemental sealing pad 202 preferably is positioned beneath the lower end of the jamb member section 196 and above the flange 172 of the supporting plate 162. The pad 202 extends downward over the edge of flange 172 into contact with the top face 134 of the sill and effectively seals the space between the lower end of the jamb section 196 and the sill as shown in FIG. 15.

The head 14 is supported in place in the same manner as the sill 12 and the upper end of the jamb section 196 is sealed with respect to the head in the same manner as the lower end thereof. Moreover, in view of the fact that the head 14 is identical with the sill 12 but is mounted in an inverted position as shown in FIG. 14A, the portions referred to as the inner face 132 and top face 134 of the sill combine to form a drain gutter in the head throughout the entire length thereof into which condensation or moisture from the panels forming the spandrels will drain. Furthermore, if any leakage of rain should occur at any point, the water will collect in the gutter of the head. While the head may be provided with "weep-holes" to drain off such water, it is preferable to provide the head with an end sealing element or dam 209 and a flexible drain line 210 as shown in FIG. 18 extending downward from the head to the mullion to drain off any moisture accumulations from the head to the hollow central body 32 of the mullion. In this way the retention of moisture is prevented even though substantial condensation or leakage should occur in the curtain wall assembly. The usual 'weep-holes" can thus be eliminated and dripping or staining of the exterior of the curtain wall is eliminated.

The window assembly 16 may be secured to the jamb members 196 and to the sill and head in any suitable manner such as the adjusting members 92 shown and described with reference to both FIGS. 8 and 18.

While the vertical cover strip 76 preferably extends throughout the length of the mullion, it ordinarily will be composed of several sections of convenient length for handling and erection. Moreover, it is often desirable to secure the vertically positioned jamb members 86 or the jamb member sections 196 in place at one elevation before applying the vertical cover strip at a higher elevation in the assembly. In some instances it may also be desirable to have one or more of the horizontal cover strips 72 extend across a vertical cover strip instead of terminating in abutment therewith. In any event, wherever the cover strips intersect, the joint may be concealed by a cover plate 211 shown in FIG. 14 which may be of the type shown and described in issued Patent No. 2,769,212.

The construction shown in FIG. 18 also serves to illustrate that form of the assembly wherein there is a window opening on only one side of the mullion. The structural tie strap 160A then is essentially in the form of one half of the tie strap 160 shown in FIGS. 15, 16 and 17 in that it extends only toward that side of the mullion to which the sill (or head) is applied. A panel 102 or other suitable elements are located on the other side of the mullion to complete the curtain wall or to afford attachment thereof to the corner constructions 6 or 8 of the building.

The curtain wall assembly thus provided lends itself to application to substantially any type of architectural and structural design and permits the spacing of the mullions much farther apart than has been possible heretofore. Moreover, the effective pressure sealing of the elements at all points where leakage might occur, while permitting expansion and contraction of the metal members, renders it possible to use extruded aluminum elements which are light in weight and give greater freedom of design to the curtain wall. Furthermore, the sealing elements provided serve as shock absorbers, reducing vibration whereby the tendency for bolts or other connecting elements to be loosened is reduced. The dampening of vibrations also aids in sound insulation even though large panels of metal or other material are used in the spandrels.

It is further pointed out that the construction serves to permit such limited longitudinal movement of each of the elongated metal elements as may be necessary to allow for thermal expansion and contraction thereof. This is true even though many of the elements are secured together by bolts threaded into thread coupling channels. Thus, while the bolts are positively restrained against any transverse tilting movement whatever by the webs or side walls of the thread coupling channels, they are restrained against tilting movement in a direction lengthwise of the metal members only by the engagement of the portions of the threads of the bolts located at opposite sides of the bolts with the ribs of the channels. As a result, the resistance to longitudinal tilting of the bolts is not as great as the resistance to transverse tilting thereof. Accordingly, the bolts are actually capable of undergoing the minute longitudinal tilting movement which may be necessary to allow for thermal expansion and contraction of the members. Such movement may take place without bending the bolt or appreciably reducing the strength of the connection between the bolt and the thread coupling channel. The curtain wall assembly of the present invention therefore may be said to embody elongated metal elements which are unidirectionally fixed in position in that they are so mounted as to permit longitudinal movement thereof sufficient to accommodate for thermal expansion and contraction while preventing transverse movement of the elements.

It will also be noted that only a limited number of standardized elements are required and they are largely interchangeable and usable in various locations and arrangements.

When curtain walls embodying the present invention are employed in single story buildings, the mullions of the assembly may serve as load bearing members rendering it possible to reduce or eliminate many or all of the external bearing members such as posts, lally columns and the like ordinarily required to support the roof.

As shown in FIG. 19, the lower end of the mullion 10D is fixedly mounted on the foundation 220. For this purpose, a flashing strip 222 is placed over the foundation and a base plate 224 is positioned over the flashing. Angle members 226 are positioned on the upper surface of base plate 224 and secured in place by anchor bolts 228 which pass through the horizontal portions of the angle members. The upstanding flanges 230 of the angle members 226 extend into the open hollow body 32 of the mullion adjacent the opposite sides thereof and are secured to the mullion by the bolts 232. In this way the mullion is rigidly supported on the foundation, whereas the lower end of the mullion may be spaced from the foundation 220 a distance sufficient to allow for drainage of water therefrom. If desired, a hood 234 may be secured to the outer side face 139 of the mullion and extend outward and downward over the anchor bolts 228 and into contact with the foundation to protect the anchor bolts from the weather and to present a neat architectural appearance.

The members 42 by which the panels or sheet material 102 are supported are positioned on the gasket 54 and are secured in place by anchor bolts 44 in the manner shown and arrangement described above in connection with FIG. 5 of the drawing. The assembly thus provides a sealed and water-tight construction adjacent the foundation while the mullion is mounted at its base in a manner to receive whatever load is applied to the mullion and to transmit it to the foundation through the angle member 226.

Figure 22:
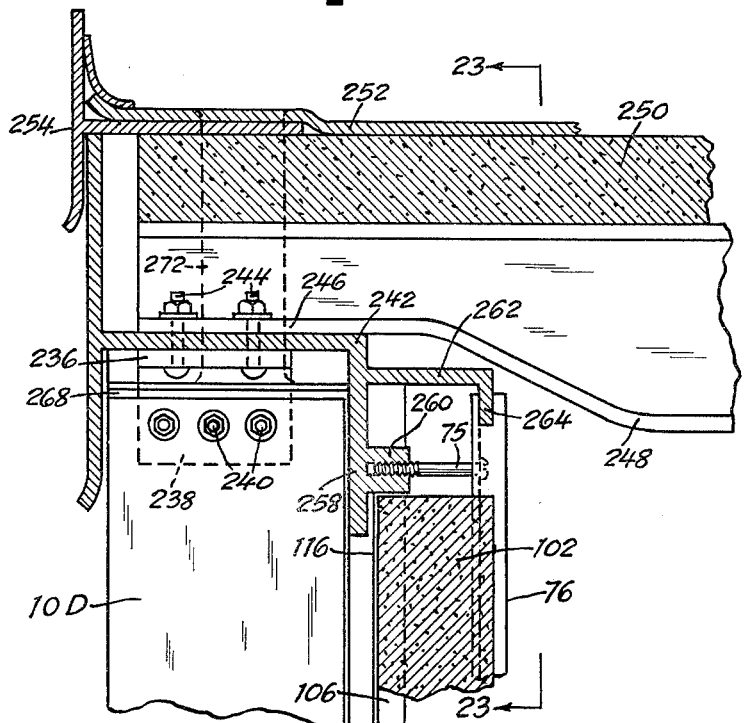
FIG. 22 is a vertical sectional view through the upper portion of a curtain wall employed as a load bearing structure in accordance with the present invention.
Figure 23:
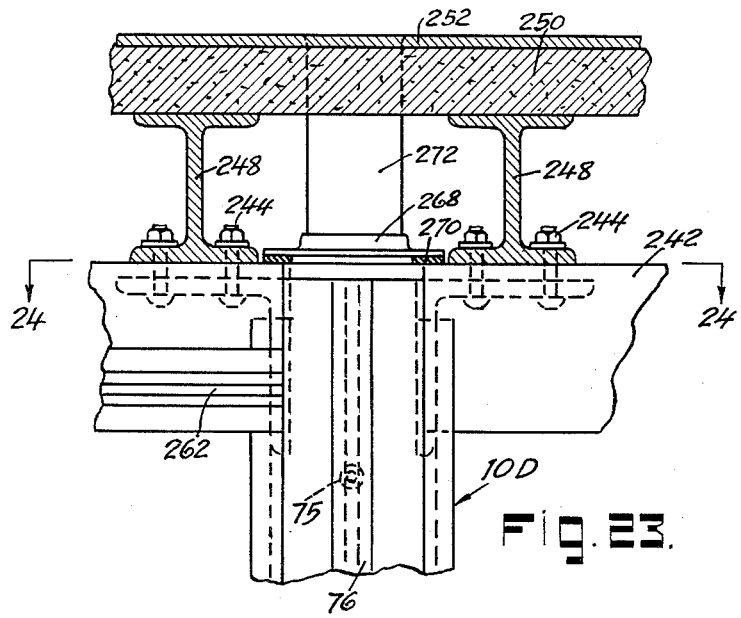
FIG. 23 is a vertical sectional view taken on the line 23—23 of FIG. 22.
Figure 24:
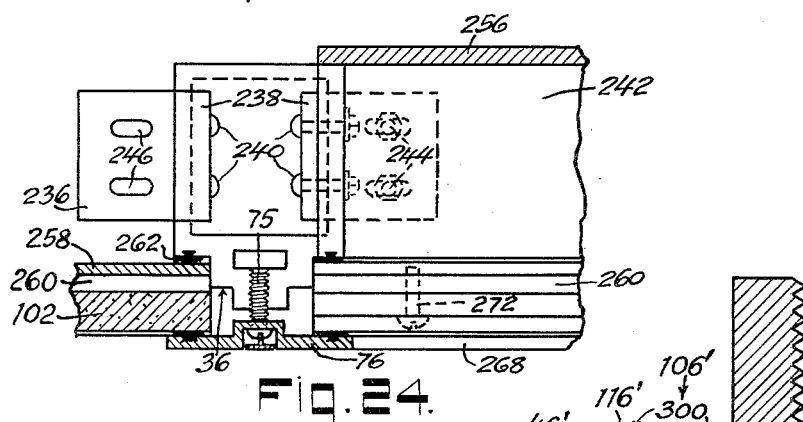
FIG. 24 is a horizontal sectional view taken on the line 24—24 of FIG. 23.

The upper end of the mullion is located adjacent the roof and is designed to receive and support the load from the roof. As shown in FIGS. 22, 23 and 24, angle members 236 are formed with downwardly extending flanges 238 which extend into the hollow body 32 of the mullion adjacent the opposite sides thereof and are secured to the mullion by the bolts 240. The upper horizontal flanges of the angle members are preferably spaced a short distance above the upper end of the mullion 10D and serve as a support upon which horizontally extending top plates 242 rest. Bolts 244 extend through elongated slots 246 in the horizontal portion of angle members 236 and serve to secure the top plates 242 to the angle members. In this way the load applied to the top plates is transmitted to the mullions and through the mullions to the lower angle members 226 on the foundation 220. However, longitudinal expansion and contraction of the top plates may occur upon changes in temperature by reason of the provision of the elongated slots 246 in the horizontal flange of the angle member 236.

The structural system which makes up the roof may be of any suitable or preferred type, but as shown, includes beams 248 which have their ends bearing upon the top plates 242. The beams are securely bolted to the top plate to secure them in place and as shown in FIG. 23, the bolts 244 which secure the top plate to the angle member 236 may also serve to secure one of the beams 248 in place.

Roof slabs 250, or any other preferred type of roofing structure, are supported by the beams 248 and an upper sealing layer or composition 252 may be applied over the roof slabs. Similarly, a gravel stop 254 and other elements of the roof assembly may be applied in a conventional manner.

As shown in FIG. 22, the top plate 242 may be formed of an extruded aluminum strip or other metal element provided at its outer edge with a vertically extending spandrel, or trim portion 256 which cooperates with the gravel stop 254 to afford a finished roof assembly. The inner edge of top plate 242 is formed with a downwardly extending flange 258 having the end thereof located in the inner reveal 46 of the mullion 10D and in sealing contact with the sealing strip 48 on the inner face of the reveal. The flange 258 further is provided with a horizonally extending thread coupling channel 260. An extension 262 of the top plate 242 extends inwardly and downwardly along the inner edge of the top plate and presents a marginal extremity 264 engageable by the vertical cover strip 76. The cover strip is urged against the extremity 264 and against a sheet or panel 102 by bolts 75 which extend through the cover strip and into thread coupling channel 34 of the mullion.

Since the ends of the top plates 242 at opposite sides of the mullion 10D are spaced apart by the tongue 36 of the mullion, a cap 268 is applied over the upper end of the mullion and a gasket 270 is positioned between the mullion and cap to seal the same and prevent leakage between the cap and top plates 242. However, if desired a drain 272 may extend through the roof deck 250 to the upper end of the mullion so that the mullion may serve in effect as a downspout.

The construction thus provided is structurally designed so that the center lines, or the lines of reaction of the load bearing top plates 242 by which the roof is supported, coincides with the neutral axis of the mullion. Furthermore, the roof system carried by the top plate and mullions must be sufficiently rigid horizontally to prevent lateral movement of the upper ends of the mullions resulting from high wind pressures. As a result, a structural assembly having the maximum load bearing characteristics is provided rendering it possible to combine the attractive architectural advantages of a simplified curtain wall assembly with the structural strength and wind resistance comparable to that of a fabricated steel framework for a building.

Each of the forms and modifications of the elements shown and described above is designed to permit the use of aluminum throughout the curtain wall and to allow for the relatively great expansion and contraction thereof without imposing undue strains on any portion of the assembly. At the same time the provision of sealing elements at all points wherein leakage of water might occur and the special design and arrangement of such sealing means assure the desired weather-tight structure despite any expanded or contracted condition of the elements.

The sealing elements used in numerous locations throughout the assembly may be of any suitable or preferred type. As shown in most of the views of the drawings, the extruded aluminum members have a longitudinally extending groove therein presenting a relatively narrow opening whereby a strip of sealing material formed of rubber, neoprene or the like may be held in place by an enlarged retaining portion located within the groove while the outer sealing surface of the sealing element may be flat ribbed or otherwise formed. However, in order to insure a more effective seal, the construction of FIG. 25 may be used. As there shown, the member 280 by which the sealing strip 282 is carried is provided with opposed upwardly curving or inclined fins 284 which project above the adjacent surface of the member 280. The edges of the fins 284 are spaced apart to provide a groove therebetween which has an inner enlarged channel for receiving the retaining portion 286 of the strip. The outer sealing portion 288 of the strip preferably presents a flat sealing surface 290.

Figure 25:
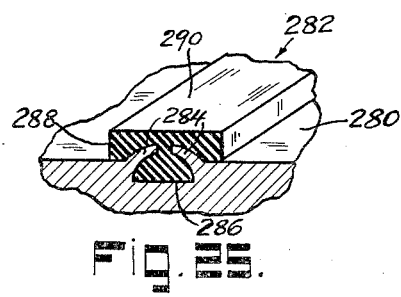
FIG. 25 is a perspective illustrating a portion of an alternative type of sealing means which may be employed in the present invention.

Compression of a sealing strip of the type shown in FIG. 25 serves to insure greater sealing effect along a localized central portion thereof in line with the fins 284 than at the outer edges of the strip. At the same time the sealing surface may be flat and parallel to the surface of the member 280 to afford a seal of extended area but varying in the degree of compression of the strip transversely thereof.

Figure 26:
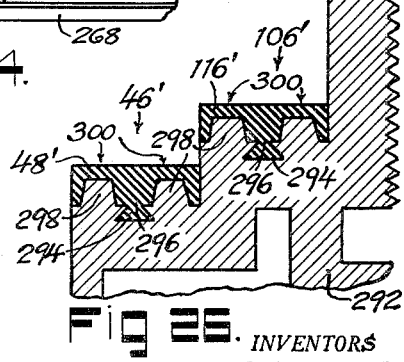
FIG. 26 is a horizontal sectional view of a portion of a mullion embodying an alternative form of sealing means.

In the alternative, the sealing means may be provided with two or more longitudinally extending lines or zones of differential sealing. As shown in FIG. 26, the mullion 292 is provided with reveals 46' and 106' having sealing strips 48' and 116' applied to the inner faces thereof and held in place by the projections 294 of the strips positioned in the keystone or restricted slots 296 extending lengthwise of the reveals. The projections 298 on the faces of the reveals are in the form of ribs having flat outer faces and are located on opposite sides of the slots 296. The sealing strips thus present parallel zones of limited compression indicated at 300 which are spaced apart from each other and from the opposite edges of the sealing strips.

The constructions provided in each of the forms of the invention illustrated are characterized by the provision of cover strips located on the inner side of the assembly which are secured to the other elements by bolts which extend through the cover strips and into thread coupling channels on vertical and horizontal elements of the assembly. These bolts effectively serve to urge the cover strips and elements together in a manner which assures compression of the various sealing means throughout the assembly. At the same time the bolts, which may be spaced apart a foot or eighteen inches as desired, may provide the only metal connection which extends through the curtain wall assembly from the exterior to the interior. As a result, the thermal conductivity of the curtain wall is limited to the area of the bolts which is of course very limited indeed. The assembly thus provides a very effective heat insulating construction and greatly reduces the amount of further insulation required in any installation.

While the use of extruded aluminum is preferred in forming the metal elements of curtain wall assemblies embodying the present invention, it is not essential to use aluminum and as a result, the novel features of the invention may be employed when using iron, steel or its alloys or any other type of metal in forming the elements of the assembly. It will, of course, be apparent that any desired type of panel may be used in forming the spandrels, whereas the window assemblies used may be of any conventional type or manufacture. The window assemblies as well as the foundation, floor and roof will ordinarily be constructed and installed independently of the curtain wall assembly. The construction thereof is therefore not pertinent to the present invention since the curtain wall assembly is universal in its application and is readily adapted for use with any standard foundation, roof, floor and window assembly desired for any particular building and for any special architectural or structural design.

For the foregoing reasons it will be evident that many adaptations and changes in the form, construction and arrangement of the elements may be made in utilizing the present curtain wall assembly in any specific installation. Accordingly, it is intended that the particular embodiments of the invention shown in the drawings and described above are to be considered as illustrative only and are not intended to limit the scope of the invention.

We claim:
1. In a multi-story building, a curtain wall assembly including a vertically extending mullion, said mullion embodying vertically aligned sections, means by which each of said sections is fixedly secured adjacent its upper end to one floor and from which each mullion section is suspended in a vertical position, each of said mullion sections having a lower portion which extends downwardly to a point adjacent a floor below and adjacent but spaced from the upper end of a lower mullion section a distance at least sufficient to permit thermal expansion and contraction of said mullion section independently of said adjacent lower mullion section, and splicing means carried by one of said mullion sections and having vertical sliding engagement with the adjacent mullion sections to hold the adjacent ends of said sections in vertical alignment.

2. In a building having a foundation, a curtain wall assembly comprising at least one vertically extending mullion provided with an inwardly extending tongue, foundation members secured to said foundation on opposite sides of said mullion and extending lengthwise of the foundation with the ends of the foundation members abutting the opposite sides of the tongue on said mullion, sheet material having the lower horizontal edges thereof positioned adjacent said foundation members and having the vertical edges thereof positioned adjacent the tongue on said mullions, horizontally extending cover strips located on the interior of said assembly urging said horizontal edges of the sheet material into retaining engagement with said foundation members, and a vertically extending cover strip secured to the tongue on said mullion and urging the vertical edges of said sheet material into retaining engagement with the tongue on said mullion.

References Cited in the file of this patent

UNITED STATES PATENTS

| | | |
|---|---|---|
| 483,948 | Smart | Oct. 4, 1892 |
| 2,085,281 | Waggoner | June 29, 1937 |
| 2,231,528 | Daniels | Feb. 11, 1941 |
| 2,265,693 | Knight | Dec. 9, 1941 |
| 2,347,756 | Swenson | May 2, 1944 |
| 2,714,431 | Peterson | Aug. 2, 1955 |
| 2,739,359 | Peterson | Mar. 27, 1956 |
| 2,780,328 | Yoder | Feb. 5, 1957 |
| 2,781,109 | Memmler | Feb. 12, 1957 |
| 2,885,040 | Grossman | May 5, 1959 |

FOREIGN PATENTS

| | | |
|---|---|---|
| 520,859 | Canada | Jan. 17, 1956 |